(12) United States Patent
Jones

(10) Patent No.: US 6,531,980 B1
(45) Date of Patent: Mar. 11, 2003

(54) RADAR ANTENNA SYSTEM

(75) Inventor: David Kelvin Jones, Guildford (GB)

(73) Assignee: Airsys ATM Limited, Surrey (GB)

(*) Notice: Subject to any disclaimer, the term of this patent is extended or adjusted under 35 U.S.C. 154(b) by 0 days.

(21) Appl. No.: 08/274,119

(22) Filed: Jul. 12, 1994

Related U.S. Application Data

(63) Continuation of application No. 07/843,294, filed on Feb. 26, 1992, now abandoned.

(30) Foreign Application Priority Data

Mar. 12, 1991 (GB) .............................................. 9105180

(51) Int. Cl.⁷ .............................................. G01S 13/00
(52) U.S. Cl. ........................ 342/157; 342/372; 342/374
(58) Field of Search ................................ 342/374, 372, 342/154, 157

(56) References Cited

U.S. PATENT DOCUMENTS

| | | | |
|---|---|---|---|
| 3,993,999 A | * 11/1976 | Hemmi et al. | |
| 4,257,050 A | 3/1981 | Ploussios | |
| 4,451,831 A | 5/1984 | Stangel et al. | |
| 4,792,805 A | * 12/1988 | Miglia | 342/372 |
| 4,811,032 A | * 3/1989 | Boksberger et al. | 343/876 |
| 4,924,235 A | 5/1990 | Fujisaka et al. | |
| 5,038,147 A | * 8/1991 | Cerro et al. | 342/368 |
| 5,099,247 A | * 3/1992 | Basile et al. | 342/380 |
| 5,134,416 A | * 7/1992 | Cafarelli et al. | 342/372 |
| 5,172,125 A | * 12/1992 | Peregrim et al. | 342/154 |

FOREIGN PATENT DOCUMENTS

| | | |
|---|---|---|
| GB | 1171626 | 11/1969 |
| GB | 1323384 | 7/1973 |
| GB | 1524770 | 9/1978 |
| GB | 2018034 | 10/1979 |
| GB | 2143099 | 1/1985 |
| GB | 2219471 | 12/1989 |
| GB | 2232318 | 12/1990 |
| GB | 2232536 | 12/1990 |
| WO | 86/00760 | 1/1986 |

OTHER PUBLICATIONS

"Array Aperture Sampling Technique for Multipath Compensation," by F. G. Willwerth et al., Microwave Journal, vol. 19, No. 6, Jun. 1976, pp. 37–39.

* cited by examiner

Primary Examiner—Theodore M. Blum
(74) Attorney, Agent, or Firm—Crowell & Moring LLP

(57) ABSTRACT

In a radar antenna system comprising antenna elements arranged in an active array, the elements are located in predetermined groups such that an individual group can be selected electronically from within the whole array aperture, the said selection being effected by variable attenuator means. This produces a phase difference between direct and multipath reflections so that the radar information from a direct reflection can be distinguished from multipath information.

4 Claims, 2 Drawing Sheets

RADAR ANTENNA SYSTEM

Figure 1:
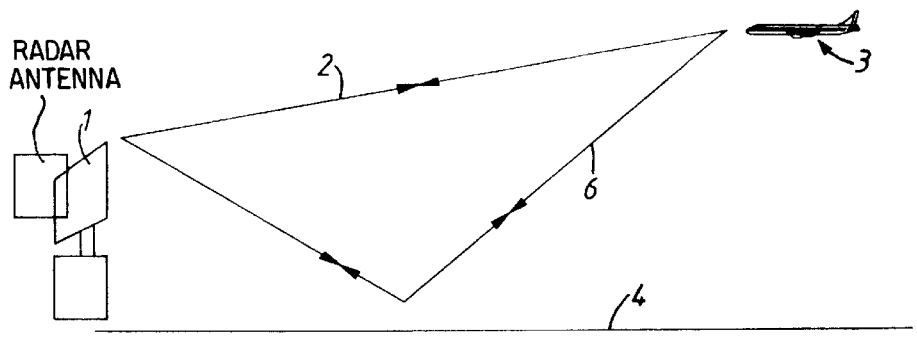

This is a continuation of application Ser. No. 07/843,294, filed Feb. 26, 1992, now abandoned.

This invention relates to a radar antenna system. In particular, the invention relates to an active antenna array of the kind which can be scanned electronically in order to effect tracking of a target position in space. The invention is applicable to tracking and multifunction radar apparatus which might be used in weapon systems, microwave landing systems, airborne and space based radar apparatus, for example.

The conventional radar apparatus in performing a tracking function frequently makes use of a circularly symmetric reflector system which creates a pencil beam which is steered mechanically in azimuth and elevation. In an alternative construction, a passive phased array has a single lumped transmitter whose power output is fed to the elements of an electronically steerable antenna array. The feeder arrangement includes high power RF signal networks including phase shifters for transmission and a similar network for the receive function. The antenna array is then capable of producing a single RF signal beam or multiple beams in space.

Both the mechanically steerable and the electronically steerable antennas can suffer from the effects of reflections or multipath signals from the ground or sea surface between a tracked target and the radar apparatus. The effect of these multipath signals is to degrade the capability of the apparatus to track the image of the target arising from the reflection.

Various techniques have been used in attempts to overcome the problem. One proposed technique is to shape the tracking beam in order to minimise the proportion of the radar energy transmitted in the direction of the land or sea surface. Any improvement in performance is limited by the antenna aperture available and whatever freedom there might be to shape the pattern sufficiently without losing the tracking performance of the radar system.

An alternative technique is to use a very wide band operation. This possibility may not be favoured because of the very wide bandwidth which may be necessary to decorrelate the wanted and unwanted signals, and the cost of the hardware needed to achieve the wide bandwidth.

The present invention was devised to provide a further alternative in which phase differences between the wanted and unwanted signals are able to be used.

According to the invention, there is provided in a radar antenna system comprising an active antenna array formed of antenna elements each of which is connected directly to a respective RF transmit/receive module, the method of operation which comprises considering a particular block of one or more elements within the array as forming a first element group, considering a second block of elements as forming a second element group, transmitting a radar signal from one of said element groups, receiving a return signal at the same or a different one of said element groups, and switching a radar receiver electronically between said first and said second element groups so as to produce a phase difference between a direct and a multipath reflection of the transmitted signal, said phase difference enabling radar information from a direct reflection to be distinguished from that due to a multipath reflection.

Preferably, two or more element groups of the array are arranged such that the antenna phase centre is movable vertically as well as horizontally within the array area. The element groups may be arranged such that the antenna phase centre is able to be rotated circularly or elliptically within the array area.

In a different embodiment, there is provided a radar antenna system comprising antenna elements arranged in an active array, the elements being located in predetermined groups such that an individual group can be selected electronically from within the whole array aperture, the said selection being effected by variable attenuator means. The variable attenuator means may comprise a RF signal feed network or a switch.

Figure 3:
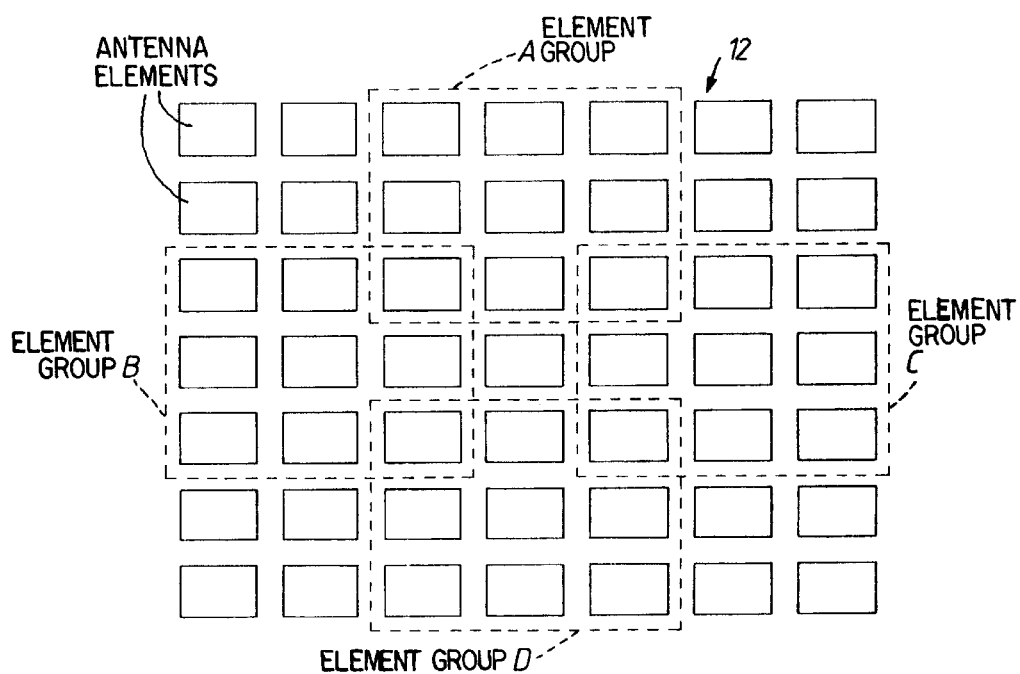
Figure 2:
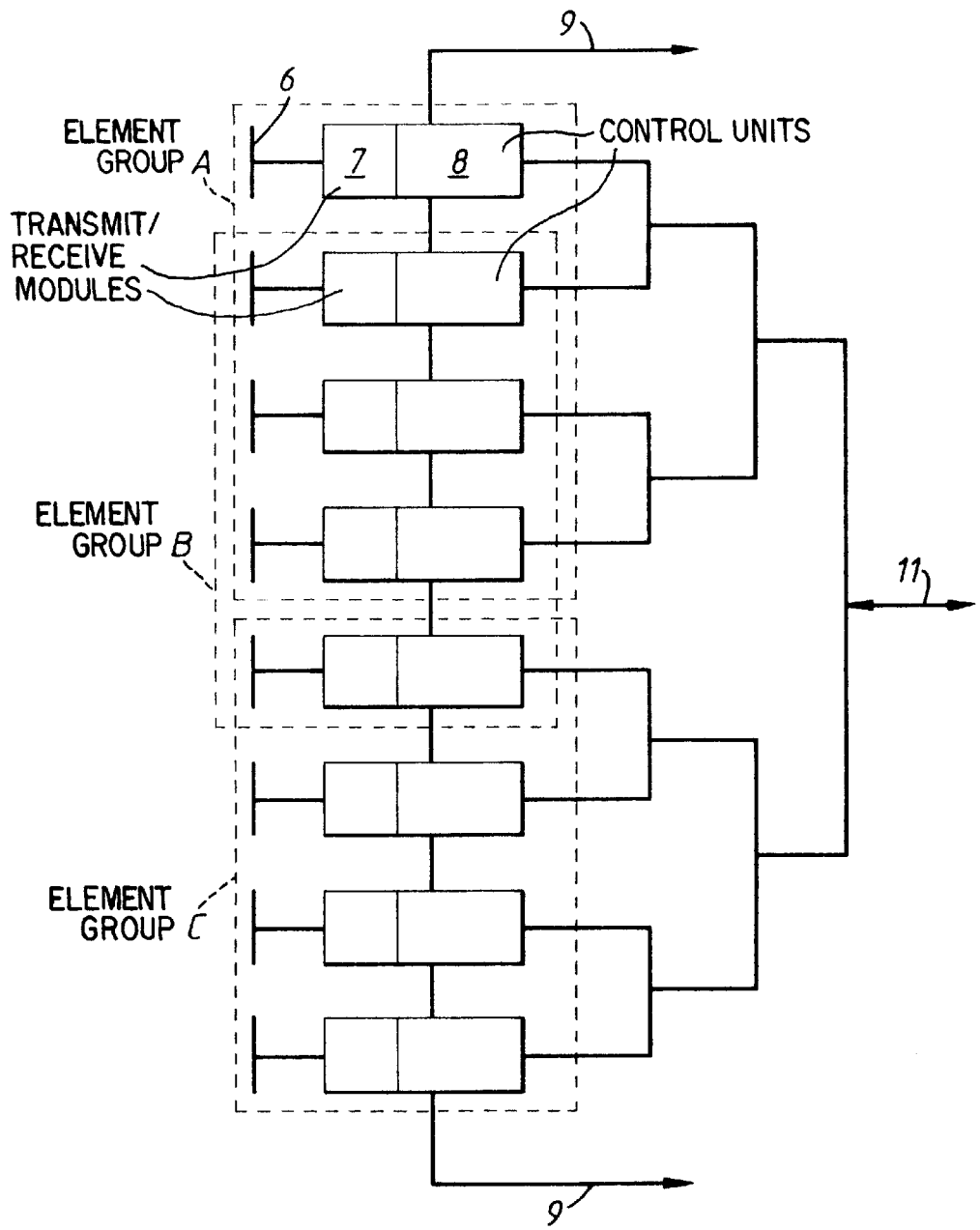

By way of example, a particular embodiment of the invention will now be described with reference to the accompanying drawings, in which:

FIG. 1 is a sketch of a radar antenna and target showing the geometry by which a multipath reflection can arise, FIG. 2 is a block diagram of a radar antenna in the form of a linear array, and, FIG. 3 depicts a planar antenna array illustrating how a phase centre of the array can be moved to different positions within the total array area.

The particular conditions under which a multipath reflection can occur are shown in FIG. 1. A radar antenna 1 directs a tracking beam 2 towards a target 3. The target 3 then reflects part of the beam 2 back along the same path to the antenna 1. The resulting wanted signal when it is received by the antenna 1 then serves to permit tracking of the target 3 by the radar system. In this situation, only a single reflection of the tracking beam has occurred.

When the target 3 is separated from the antenna 1 by a horizontal surface 4 such as a land or sea surface, there is the possibility that a further part of the beam 2 scattered from the target 3 will be reflected from this surface and will follow a different path back to the antenna 1. The resulting doubly reflected beam 6 when it is received at the antenna 1 will then interfere with or at least reduce the clarity of the information received from the wanted signal. Since the radar antenna 1 is not capable in practice of producing a truly narrow single beam which will travel in a straight line to the target 3, there is also the possibility that a part of the output beam will first be reflected from the surface 4, then strike the target 3 and be reflected back along the same path to the antenna 1. This is an additional situation where a multipath reflection could occur.

The possibility of multipath reflections will of course be significantly increased if the target 3 is spaced by only a short distance from the surface 4. This will make it particularly difficult for the radar system to give a correct interpretation of the results received from the reflections.

FIG. 2 shows a linear array antenna construction where the phase centre of the array is capable of being moved in order to decorrelate the wanted and unwanted signals. The Figure shows eight antenna elements 6 each of which is associated with a transmit/receive module 7 which is coupled to a control unit 8. The control units 8 are connected to a beam steering control computer by the lines 9. The signals to be received or transmitted are combined from all the control units 8 and then form an RF input/output signal on the line 11.

In operation of the array, the signals on line 9 from the beam steering control computer are able to select from the total number of elements in the array, only the uppermost four of these elements. This group of elements is termed Element Group A as indicated by the reference A in the Figure. Similarly, a further group of elements is indicated by reference B and a third group by reference C. It will be clear that the computer would be able to select still further groups of four from the total of eight elements mentioned in this example. In addition, the computer will be able to switch quickly between Element Group A to Element Group C in order to vary the phase relationship between the transmitted/received and the unwanted multipath signals.

FIG. 3 shows a planar antenna array 12 where particular groups of elements are shown to be capable of excitation at different times. Out of the total of fortynine elements in the array, four groups of nine elements are capable of being excited together and these groups are indicated by the references A, B, C and D. It will be clear that there is great scope within the array of exciting different groups of nine elements or of choosing further groups of one, two, three, four or sixteen elements, for example. The object of making such a selection is to allow the phase centre of the transmitted or received signals to be moved about over the area of the array so that the system will have a further means of distinguishing between the wanted and the unwanted multipath signals.

It has been found in practice that the movement of the antenna position can be continuous or discontinuous in time causing a modulation of the received signal as wanted and unwanted signals change their relative phases. The wanted signal amplitude and phase can be calculated from a knowledge of the amplitude and phase of the modulated signal.

The effect of multipath reflections in radar systems can be severe not only from the signal reflection point in the elevation plane formed by the target, the reflection point and the radar antenna, but also from reflection points distributed in azimuth. The method disclosed will also greatly assist the process of separating the wanted and unwanted signals which originate from a number of azimuth reflections. In this case, the antenna aperture can be electronically moved in the horizontal or vertical direction. Circular or elliptical rotation of the array phase centre will act to modulate the signal to decorrelate the multiple reflections.

The foregoing description of embodiments of the invention has been given by way of example only and a number of modifications may be made without departing from the scope of the invention as defined in the appended clams. For instance, it is not essential that the antenna array should be entirely static so that all the beam movements must be effected electronically, in an alternative embodiment, the array could additionally be mechanically movable in order to direct the beam.

What is claimed is:

1. A method of operating a radar antenna system comprising an active antenna array formed of antenna elements each of which is connected directly to a respective RF transceiver module, the method of operation comprising the steps of:

establishing a first element group consisting of a predetermined number of antenna elements within the array, establishing a second element group consisting of said predetermined number of antenna elements within the array by shifting a block of the same number of elements about the array, transmitting a radar signal from at least one of said element groups, receiving a return signal at said element groups, and producing a variation in phase difference between a direct and a multipath reflection of the transmitted signal by switching a radar receiver electronically between said first and said second element groups to change a phase centre of the antenna array.

2. A method as claimed in claim 1, in which the antenna elements of said second block include some of said elements present in said first block.

3. A method as claimed in claim 1, in which two or more element groups of the array are arranged such that an antenna phase centre is established and is movable vertically as well as horizontally within the array area.

4. A method as claimed in claim 3, in which the element groups are arranged such that the antenna phase center is able to be rotated one of circularly or elliptically within the array area.

* * * * *